United States Patent [19]
Mochizuki

[11] Patent Number: 5,828,313
[45] Date of Patent: Oct. 27, 1998

[54] RADIO PAGING RECEIVER FOR DISPLAYING A CALL MESSAGE WHICH INCLUDES ILLUSTRATION

[75] Inventor: Yasuyuki Mochizuki, Shizuoka, Japan

[73] Assignee: NEC Corporation, Tokyo, Japan

[21] Appl. No.: 684,616

[22] Filed: Jul. 22, 1996

[30] Foreign Application Priority Data

Jul. 21, 1995 [JP] Japan ................................ 7-185143

[51] Int. Cl.⁶ ................................................ H04M 11/00
[52] U.S. Cl. ........................ 340/825.44; 340/825.47; 345/115; 345/116; 345/193; 345/194; 379/93.05; 455/38.1; 455/38.4
[58] Field of Search ................... 340/825.44, 825.47; 345/115, 116, 194, 193, 121; 379/93.05; 455/38.1, 38.4, 566; 364/140

[56] References Cited

U.S. PATENT DOCUMENTS

| | | | |
|---|---|---|---|
| 4,992,781 | 2/1991 | Iwasaki et al. | 345/115 |
| 5,043,718 | 8/1991 | Shimura | 340/825.44 |
| 5,095,307 | 3/1992 | Shimura et al. | 340/825.44 |
| 5,262,764 | 11/1993 | Inamori et al | 345/115 |
| 5,323,175 | 6/1994 | Doi et al. | 345/194 |
| 5,572,233 | 11/1996 | Kakegawa | 345/116 |
| 5,583,921 | 12/1996 | Hidaka | 379/93.05 |

FOREIGN PATENT DOCUMENTS

2-82824  3/1990  Japan .

*Primary Examiner*—Michael Horabik
*Assistant Examiner*—Yves Dalencourt
*Attorney, Agent, or Firm*—Sughrue, Mion, Zinn, Macpeak & Seas, PLLC

[57] ABSTRACT

For a message display region composed of a matrix of display segments each displayable of an arbitrary element of a set of characters and divided into a matrix of subregions each consisting of a predetermined number of display segments and displayable of one of a plurality of illustrations, a subsequence of a message code sequence contains a combination of an illustration code representing an arbitrary one of the illustrations and a position code representing an arbitrary one of the subregions, to which a controller is responsive for providing an image data sequence with information of the position code so that the display region displays the arbitrary illustration by the predetermined number of display segments at the arbitrary subregion, allowing the remaining display segments to elementwise continuously display a subset of the set of characters.

4 Claims, 6 Drawing Sheets

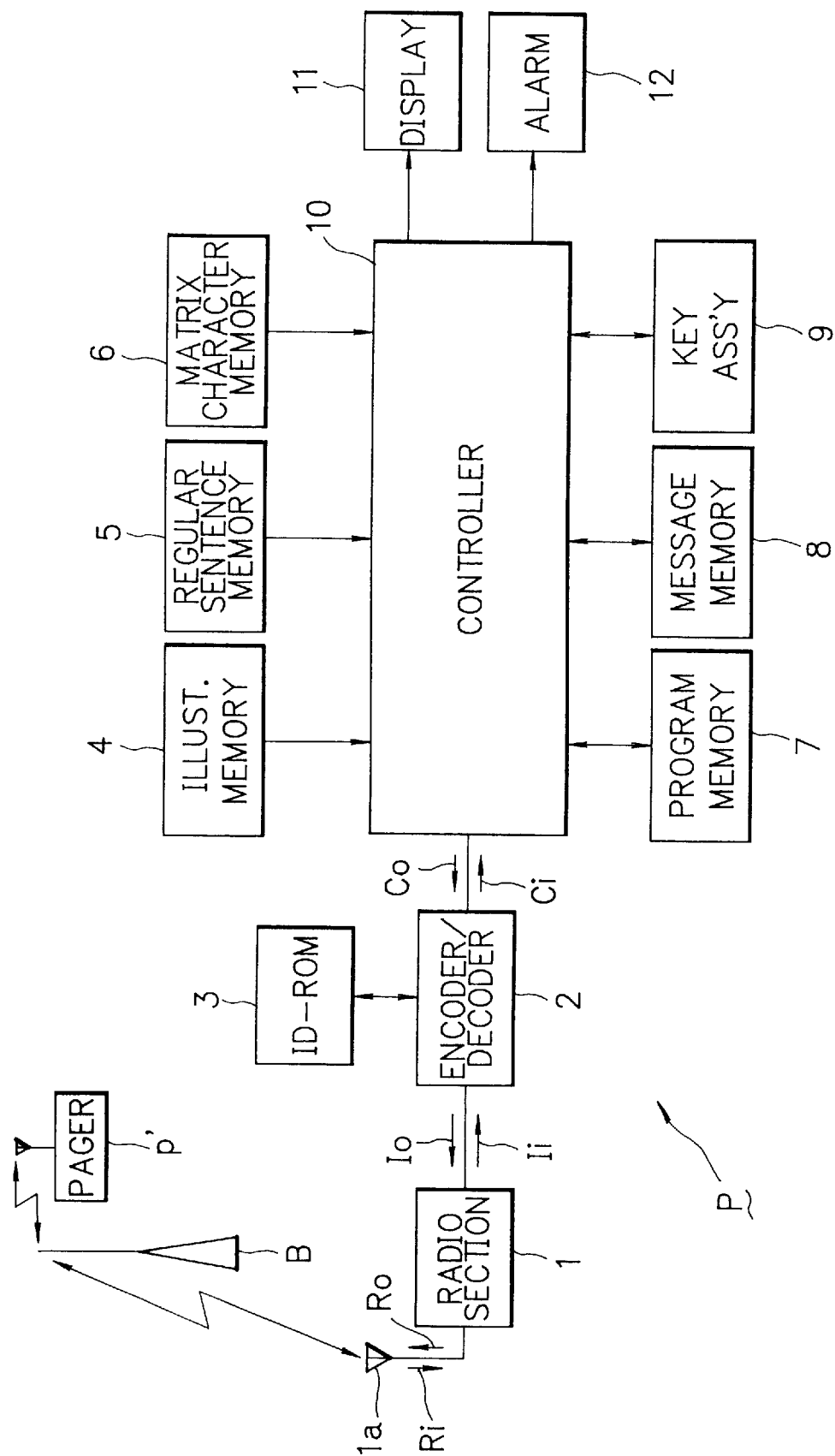
F I G. 1

[[021]] 02012-3456

[[022]] 02012-3456

[[023]] 02012-3456

[[024]] 02012-3456

FIG. 4
| No. | REGULAR SENTENCES |
|---|---|
| 01 | 予定の時間です。 |
| 02 | 会社に電話して下さい。 |
| 03 | 売って下さい。 |
| 04 | 応援頼みます。 |
FIG. 5
| Col\Row | 1 | 2 | 3 | 4 | 5 | | |
|---|---|---|---|---|---|---|---|
| 1 | あ | い | う | え | お | | |
| 2 | か | き | く | け | こ | | |
| 3 | さ | し | す | せ | そ | | |
| | | | | | | | |
| | | | | | | | |
FIG. 6
| No. | ILLUSTRATIONS |
|---|---|
| 01 |  |
| 02 |  |
| 03 |  |

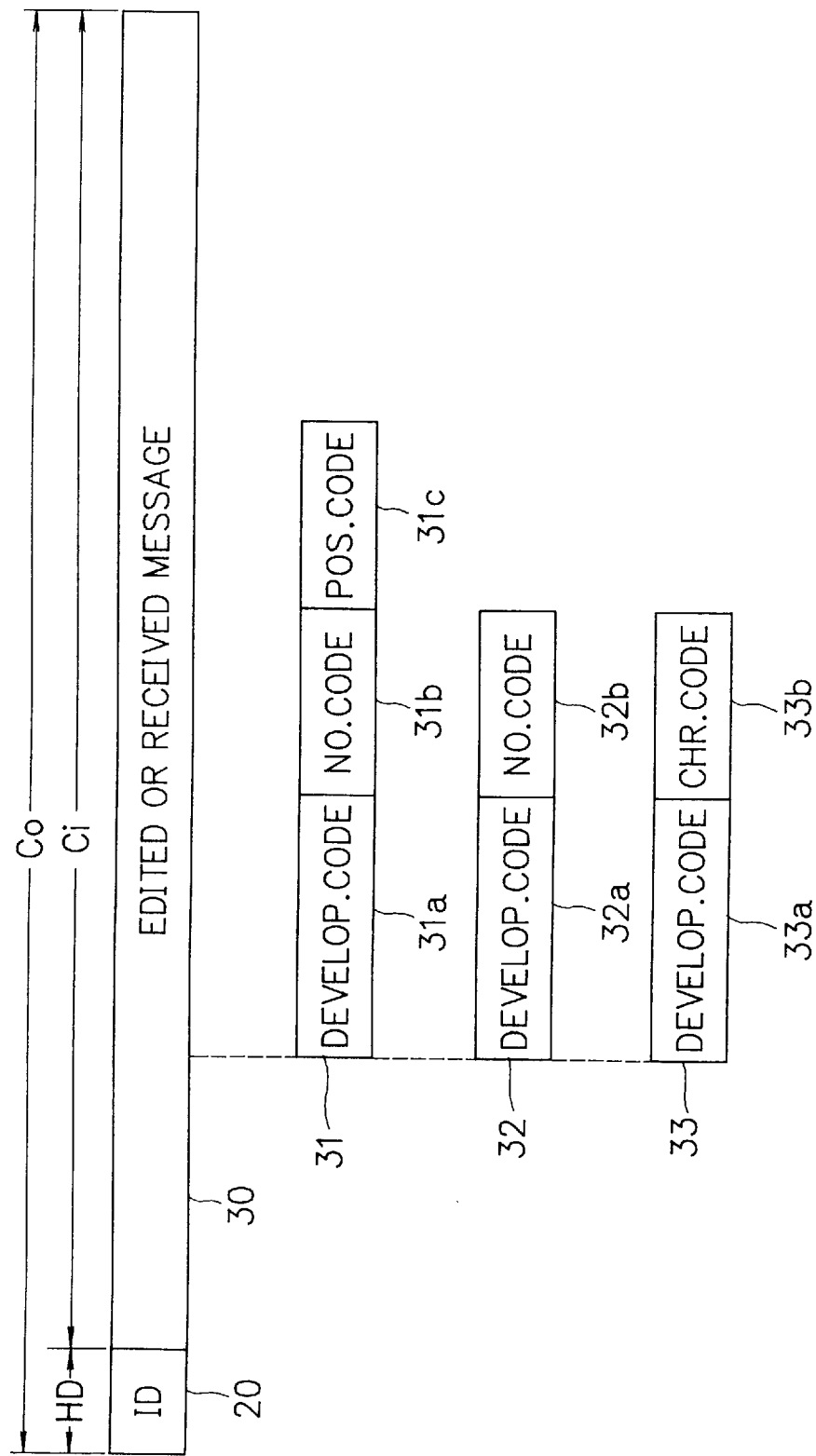

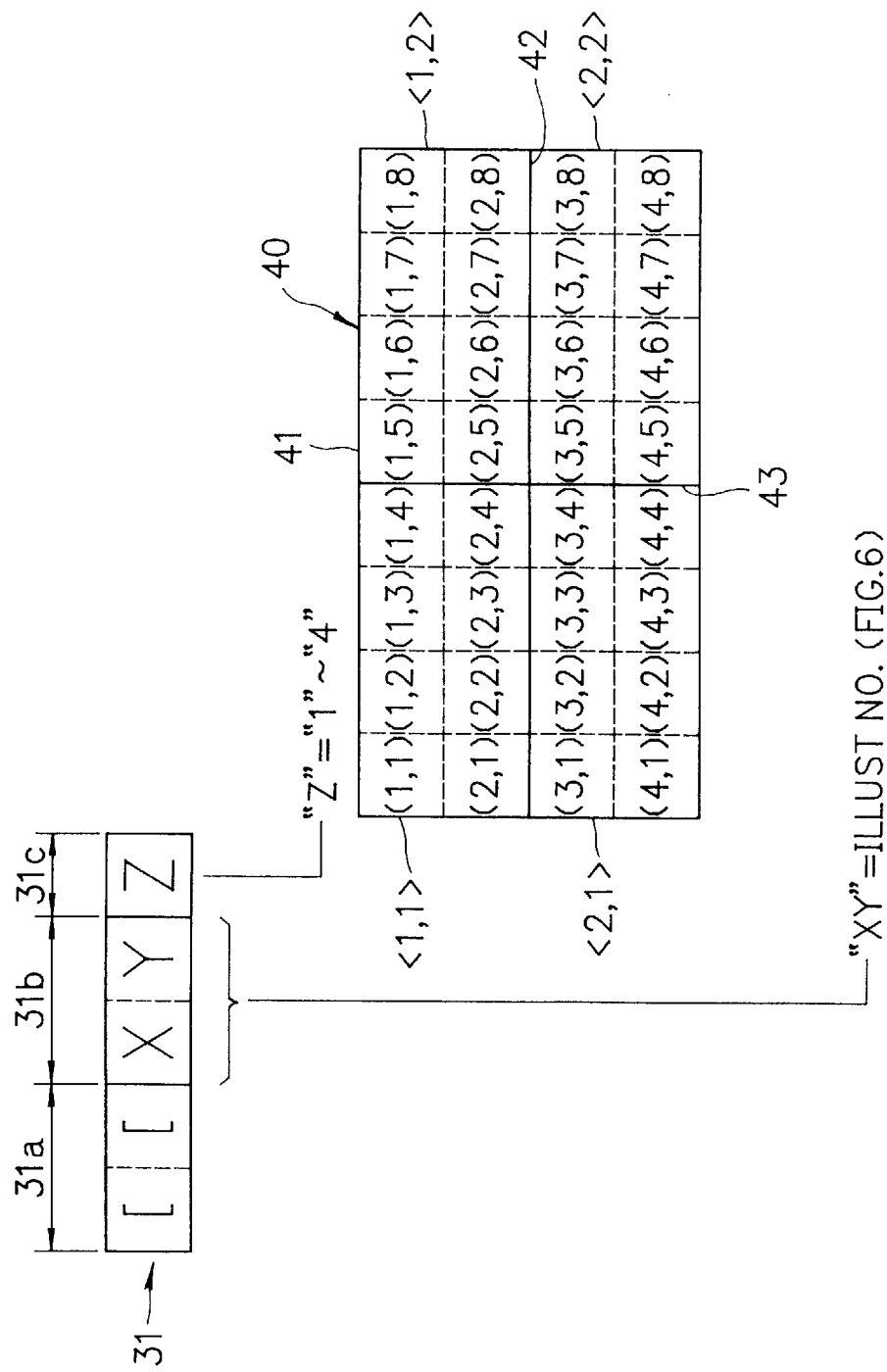

RADIO PAGING RECEIVER FOR DISPLAYING A CALL MESSAGE WHICH INCLUDES ILLUSTRATION

BACKGROUND OF THE INVENTION

The present invention generally relates to a radio paging receiver (hereafter sometimes "pager") with a display function, and particularly, to a pager implemented to receive information as coded data of a call message including an illustration for displaying the message, as it is decoded to be developed therefor by a display function of the pager.

DESCRIPTION OF THE RELATED ART

In such a type of conventional pager with a display function, a call message is edited to be encoded as a sequence of codes of a selected one of listed regular sentences and/or some of listed characters such as alphabets, figures and Japanese KANJI, KANA and/or KATA-KANA characters, in accordance with key operations of an operator.

Such the conventional pager has an illustration code table to be referred to for selecting to transmit an arbitrary one of listed illustration codes, thereby effecting a transmission of a corresponding illustration.

However, a received code sequence is decoded to be developed in order simply from a heading code, with the impossibility of displaying a transmitted illustration in line with words and/or characters of the message, thus constituting an obstruction to a flexible use of a message including an illustration.

In other words, when a call message is developed to be displayed on a display, an accompanied illustration solely occupies a predetermined number of rows of pixels of the display so that the message is unnaturally divided into upper and lower parts or downwardly shifted or the illustration is displayed alone in a lower display area. As a result, an effective display area for the message is reduced. Still less, some essential information tends to disappear from an initial display page of the message.

As another conventional implementation permitting a call message to be edited, there is proposed "a paging receiver with a message transmission function and an auto-dialer device" in Japanese Patent Application Laid-Open Publication No. 2-82824.

According to the Publication, the paging receiver has a plurality of regular phrases stored as message pieces in a regular sentence memory so that an arbitrary one of them is selectable to be displayed together with a corresponding code of a contracted length. Messageable information thus simply contains a sentence of regular phrases.

The paging receiver is unable to edit a transmission message having an illustration in line with a full or abbreviated sentence. Upon reception of a call message with an illustration in line with a sentence, it fails in development for a display of the message.

The present invention has been achieved with the foregoing problems in mind.

SUMMARY OF THE INVENTION

It therefore is an object of the present invention to provide a radio paging receiver with a display function for displaying a received message having an illustration in line with a sentence.

To achieve the object, a genus of the present invention provides a radio paging receiver including a first memory for storing therein a plurality of subsets of a set of character data of which an arbitrary one is representative of a corresponding one of a plurality of subsets of a set of characters and accessible by a corresponding one of a plurality of first codes, a second memory for storing therein a plurality of illustration data of which an arbitrary one is representative of a corresponding one of a plurality of illustrations and accessible by a corresponding one of a plurality of second codes, a controller sequentially responsive to a code sequence representative of a page message, the code sequence containing the corresponding first code and the corresponding second code, for reading a corresponding data sequence containing the arbitrary subset of the set of character data from the first memory and the arbitrary illustration data from the second memory and processing the read data sequence to provide a sequence of image data, and a display member responsive to the sequence of image data for displaying the page message containing the arbitrary subset of the set of characters and the arbitrary illustration, wherein the display member has a display region for displaying thereon the page message, the display region being composed of a matrix of display segments each respectively displayable of an arbitrary element of the set of characters, the display region being divided into a matrix of subregions each respectively consisting of a predetermined number of elements of the matrix of display segments and displayable of an arbitrary one of the plurality of illustrations, wherein the code sequence has a subsequence thereof containing a combination of the corresponding second code and a third code representing a certain element of the matrix of subregions of the display region, and wherein the controller is responsive to the sequence of the code sequence to provide the image data with additional information representative of the third code so that the display region displays the arbitrary illustration by the predetermined number of elements of the matrix of display segments at the certain element of the matrix of subregions, allowing the remaining elements of the matrix of display segments to elementwise continuously display the arbitrary subset of the set of characters.

Therefore, according to the genus of the invention, a radio paging receiver with a display member is permitted to display an arbitrary one of available illustrations over a predetermined number of display segments in an arbitrary one of matrix-arrayed subregions of a display region of the display member, allowing display segments of the remaining subregions to elementwise continuously display a subset of a total set of available characters.

Moreover, to achieve the object, another genus of the present invention provides a radio paging receiver with a display function responsive to code information of a regular sentence, an illustration and a matrix character contained in a message signal following a received paging number for reading to display the regular sentence, the illustration and the matrix character, as they correspond thereto, wherein the radio paging receiver includes means responsive to a call to an operator by a call message using code information including a customary sentence, a matrix character and letters including a figure, and an illustration, as they are prepared by another radio paging receiver having an identical call message development function to the radio paging receiver at a receiving end, for developing message information containing the illustration into an original display data sequence to display the same.

According to a species of this genus of the invention, a respective one of the radio paging receiver with the display function and said another radio paging receiver includes editing means for editing a message including the customary sentence, the matrix character and the letters including the figure, and the illustration, and developing means responsive to the call to the operator by the call message for developing the message information containing the illustration into the original display data sequence.

According to another species of this genus of the invention, a respective one of the radio paging receiver with the display function and said another radio paging receiver includes a decoder for receiving data from a radio section to detect a call to the respective radio paging receiver, an ID-ROM for storing therein an ID number of the respective radio paging receiver, an illustration memory for storing therein illustration information corresponding to code information of the illustration, a regular sentence memory for storing therein sentence information of the regular sentence, a matrix character memory for storing therein a character code of the matrix character, a program memory for storing therein a program, a message memory for storing therein received message information containing the illustration, a display for displaying the call message, and a functional controller for executing the program, as it is read from the program memory, to perform a sequence control in the respective radio paging receiver including the editing of the message information and the development of the message information into the original display data sequence.

BRIEF DESCRIPTION OF THE DRAWINGS

The objects, features and advantages of the present invention will become more apparent from consideration of the following detailed description, in conjunction with the accompanying drawings, in which:

FIG. 1 is a block diagram of a displayable pager according to an embodiment of the invention;

FIG. 4 is a table of regular sentences stored in a regular sentence memory of the pager of FIG. 1;

FIG. 5 is a map of matrix characters stored in a matrix character memory of the pager of FIG. 1;

FIG. 6 is a table of illustrations stored in an illustration memory of the pager of FIG. 1;

FIG. 7 is a format of a code sequence employed in the pager of FIG. 1; and

FIG. 8 shows an illustration development code, a matrix of illustration-displayable subregions, and an illustration-representative subsequence of a code sequence employed in the pager of FIG. 1.

DESCRIPTION OF THE PREFERRED EMBODIMENTS

Figure 2:
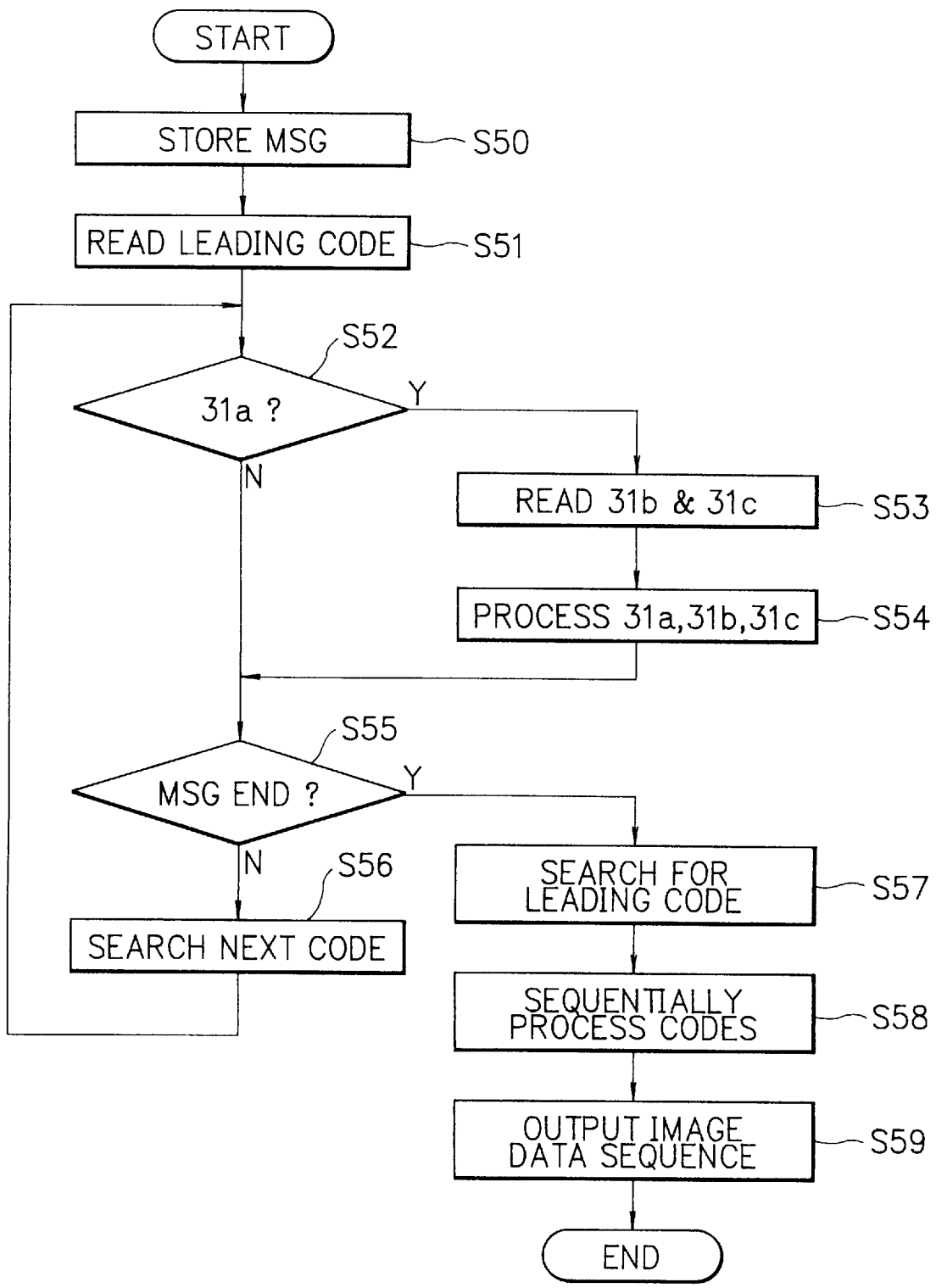
FIG. 2 is a flow chart of actions of the pager of FIG. 1.
Figure 3A:
FIGS. 3A to 3D are exemplary page messages displayed on a display of the pager of FIG. 1, respectively.
Figure 3B:
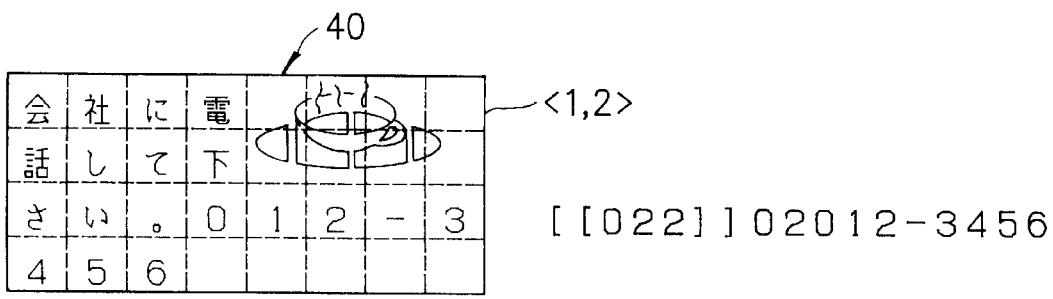
Figure 3C:
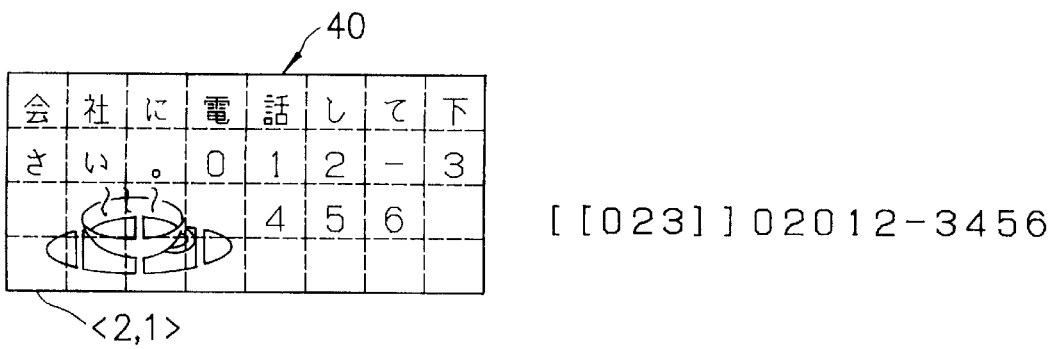
Figure 3D:
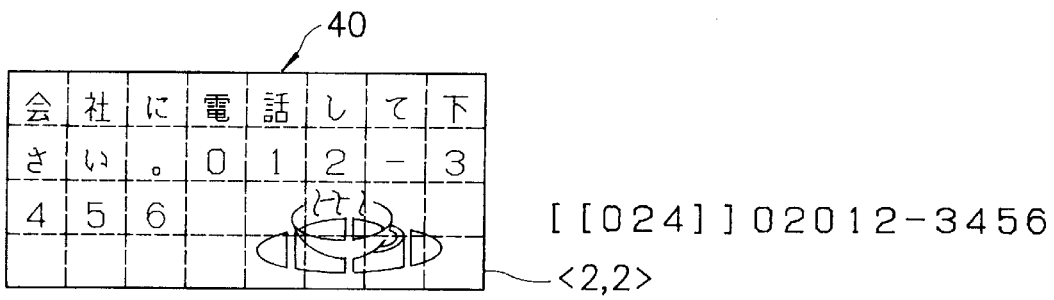

There will be detailed below the preferred embodiments of the present invention, with reference to the accompanying drawings. Like members are designated by like reference characters.

FIG. 1 shows a block diagram of a displayable pager according to an embodiment of the invention.

In FIG. 1, designated at reference character P is the pager according to the embodiment, and B is a base station for a paging system including the pager P.

The pager P has a radio section 1 for converting an incoming RF (radio frequency) signal Ri, as it is received by an antenna la from another pager P' via the base station B, into an IF (intermediate frequency) signal Ii and for performing a conversion of an IF signal input thereto from an encoder/decoder 2 to provide an outgoing RF signal Ro to be transmitted from the antenna la to the base station B.

The pager P includes an ID-ROM 3 as an EEPROM (electrically erasable programmable read-only memory) for storing therein a digital code of an ID (identification number) of the pager P and a digital code of a telephone number of the pager, an illustration memory 4 for storing therein a list of available illustration photos as arrayed sets of photo data each accessible to read by a corresponding illustration code representative of two digits, a regular sentence memory 5 for storing therein a list of available prestored customary sentences as arrayed sets of sentence data each accessible to read by a corresponding sentence code representative of two digits, and a matrix character memory 6 for storing therein a map of available matrix characters as matrix-addressed data of character photos, e.g. Japanese KANJI, KANA and/or KATA-KANA characters and/or English alphabets and a set of code editorial characters including ten different FIGS. (0–9), a hexadecimal notation (U), a hyphen (-) and a pair of brackets (] [), each accessible to read by a corresponding character code representative of two digits.

The pager P further includes a program memory 7 for storing therein a software program, a message memory 8 composed of a memory block for storing therein a sequence of codes of a received or edited message and a plurality of page memories for storing therein a sequence of image data developed from the code sequence stored in the memory block, and a key assembly 9 having a total of four push-button switch keys: SET, RST (reset), SEL (select) and RET (return or execute).

The pager P further comprises a functional controller 10 for executing the program, as it is read from the program memory 7, to perform a sequential control including steps for editing a code sequence of a message to be transmitted, which sequence is representative by a string of code editorial characters, and steps for developing the edited code sequence into an image data sequence of the editorial character string and for developing a code sequence of a received message into an image data sequence corresponding thereto, a display 11 responsive to a drive signal from the controller 10 for processing an associated one of the image data sequences to display the editorial character string or the received message, and an alarm 12 responsive to a drive signal from the controller 10 for notifying an owner of the pager P of a presence of the received message by using at least one of an audible sound source for producing a beep or melody, an inaudible vibration source such as a low-frequency vibrator, and a visible signal source such as an LED (light-emitting diode).

The controller 10 may preferably be operative for developing the code sequence of the received message into a corresponding sequence of code editorial characters displayable by the display 11 and for developing the code sequence of the edited message into a corresponding image data sequence displayable by the display 11.

The pager P has an unshown battery and an unshown power distribution system so that it is powered on when the SET key is operated once.

FIG. 4 shows a table of regular sentences of which a respective one has a corresponding image data sequence prepared in advance and stored in the regular sentence memory 5, at an address defined by a corresponding sentence code designatable by a corresponding sentence number consisting of two code editorial figures.

The table of FIG. 4 has at a row of sentence number "01" a Japanese customary sentence "予定の(YOTEI-NO [arranged])時間です(JIKAN-DESU [time is])。" at "02" another sentence "会社に(KAISHA-NI [to the company]) 電話して(DENWA-SITE [telephone]) 下さい(KUDA-SAI [please])。", at "03" another sentence "売って(U-TTE [sell me]) 下さい(KUDA-SAI [please])。", and at "04" another sentence "応援(OUEN [for aid])頼みます(TANOMI-MASU [I ask you])。".

Far arbitrary sentences in continuous rows of the table of FIG. 4 can be concurrently displayed on the display 11 in a vertically shiftable manner by operating the SEL key to shift a cursor position, so that a sentence at the cursor position can be selected by operating the RET key.

FIG. 5 shows a map of matrix characters of which a respective one has a corresponding image data stored in the matrix character memory 6, at an address defined by a corresponding character code designatable by a combination of a corresponding row number as a single code editorial figure and a corresponding column number as a single code editorial figure.

The map of FIG. 5 has: in a first row thereof, at a first column a Japanese KANA "あ(A)", at a second column another KANA "い(I)", at a third column another KANA "う(U)", at a fourth column another KANA "え(E)", and at a fifth column another KANA "お(O)"; in a second row thereof, at a first column another KANA "か(KA)", at a second column another KANA "き(KI)", at a third column another KANA "く(KU)", at a fourth column another KANA "け(KE)", and at a fifth column another KANA "(KO)"; in a third row thereof, at a first column another KANA "さ(SA)", at a second column another KANA "し(SI)", at a third column another KANA "す(SU)", at a fourth column another KANA "せ(SE)", and at a fifth column another KANA "そ(SO)"; and in a pair of unshown default-value rows to be first read, the code editorial characters distributed to a total of eight columns.

An arbitrary portion of continuous rows of such matrix characters in the map of FIG. 5 can be concurrently displayed on the display 11 in a vertically shiftable manner by operating the SEL key to shift a cursor position, so that a character at the cursor position can be selected by operating the RET key.

FIG. 6 shows a table of illustrations of which a respective one has a corresponding image data sequence prepared in advance and stored in the illustration memory 4, at an address defined by a corresponding illustration code designatable by a corresponding illustration number consisting of two code editorial figures.

The table of FIG. 6 has at a row of sentence number "01" an illustration of a heart mark, at "02" an illustration of a coffee cup on a source, and at "03" an illustration of a person running to a waiting spot.

An arbitrary pair of such illustrations in continuous rows of the table of FIG. 6 can be concurrently displayed on the display 11 in a vertically shiftable manner by operating the SEL key to shift a cursor position, so that an illustration at the cursor position can be selected by operating the RET key.

As shown in FIG. 1, the incomming IF signal Ii is input to the encoder/decoder 2, where its heading part is first encoded into a heading code representative of an ID to be checked for a match with the pager's own ID stored in the ID-ROM 3 and, if and only when the match is detected, a remaining part of the signal Ii is encoded into a code sequence Ci representative of a received message Ci, which code sequence Ci is input to the controller 10, where it is processed to be stored in the memory block of the message memory 8.

On the other hand, when an edited message is confirmed to be transmitted by operation of the RET key, the controller 10 reads from the memory block of the message memory 8 a corresponding code sequence Co with a heading code representative of a telephone number of a destination and outputs the same to the encoder/decoder 2, where it is decoded into the IF signal Io, which is converted at the radio section 1 into the outgoing RF signal Ro, of which a heading part is converted at the base station B into a heading part representative of an own ID of the destination which may be the pager P'.

At the encoder/decoder 2, the code sequence Co may preferably have the code of the own telephone number of the pager P read from the ID-ROM 3 and added as an intermediate or ending code thereof. The encoder/decoder 2 may comprise a multiplexer/demultiplexer, a logic circuit, an AD (analog-to-digital) converter and a DA (digital-to-analog) converter.

FIG. 7 shows a format of a full code sequence, as it is decoded from the IF signal Ii or output as the code sequence Co from the controller 10.

The full code sequence comprises a heading code 20 representative of a destination ID, and a message code 30 as a sequence of codes representative of an edited or received message. The message code 30 contains at least one of an illustration code sequence 31 representative of an illustration, a sentence code sequence 32 representative of a regular sentence, and a character code sequence 33 representative of a matrix character. The message code 30 may have voluntarily mixed therein one or more illustration code sequences 31, one or more sentence code sequences 32 and one or more character code sequences 33.

The illustration code sequence 31 is composed of an illustration development code 31a consisting of codes of continuous two open-brackets "[[", an illustration number code 31b consisting of codes of two figures such as one of "01" to "03", and an illustration display position or location code 31c consisting of a code of one of four figures "1" to "4".

The sentence code sequence 32 is composed of a sentence development code 32a consisting of codes of continuous two close-brackets "]]", and a sentence number code 32b consisting of codes of two figures such as one of The character code sequence 33 is composed of a character development code 33a consisting of codes of continuous two hyphens "--", and a matrix character code 33b consisting of codes of two figures such as one of "01" to "99" that represents a matrix address.

FIG. 8 describes a detailed format of the illustration code sequence 31.

In FIG. 8, designated at reference character 40 is the afore-mentioned display region of the display 11.

The display region 40 comprises a 4-row×8-column rectangular matrix of display segments (1,1) to (4,8) defined by a frame outline 41, three horizontal broken lines and seven vertical broken lines in the figure and each composed of a multiplicity of pixel elements for displaying a complete image of an arbitrary one of available characters.

The display region 40 is divided into a 2-row×2-column square matrix of subregions <1,1> to <2,2> defined by the frame outline 41 and two solid lines 42 and 43 in the figure and each composed of an eightuple of or a 2-row×4-column rectangular matrix of display segments for displaying a complete image of an arbitrary one of available illustrations.

The illustration code sequence 31 comprises the illustration development code 31a ([[), the illustration number code 31b (XY) and the illustration position code 31c (Z), as described. The illustration position code 31c represents one (Z) of four position or location numbers: "1" corresponding to the subregion <1,1>; "2" corresponding to <1,2>; "3" corresponding to <2,1>; and "4" corresponding to <2,2>.

FIG. 2 shows a flow chart of programmed actions such as for code development of the controller 10.

At a step S50, the controller 10 has a code sequence Ci of a received message input thereto from the encoder/decoder 2, and outputs the code sequence Ci to the message memory 8, where it is stored.

Then, in a non-developed remaining portion of the stored code sequence Ci, a leading code is read at a step S51, and is checked for an illustration development code 31a at a step S52.

If the read code is the illustration development code 31a, the flow goes to a step S53 for reading an associated illustration number code 31b and an associated illustration position code 31c. Then, at a step S54, the number code 31b is processed together with the development code 31a to read a corresponding photo data sequence from the illustration memory 4 and concurrently the position code 31c also is processed to provide a corresponding subregion address data, and the read photo data sequence is combined with the subregion address data to provide an image data sequence, which image data sequence is stored in a corresponding memory region of an associated page memory of the message memory 8, permitting a voluntary access thereto for a display of the corresponding illustration in a corresponding subregion <i,j>(i,j=1~2) of the display region 40.

Unless the code in concern at the step S52 is the illustration development code 31a, the flow goes to a step S55, where the number of message characters is checked for a message end.

If no message end is detected, the flow goes to a step S56 for searching to read the next code, before it again goes to the step S52 to repeat the foregoing process until a message end comes on.

When a message end is detected at the step S55, the flow goes to a step S57, where a leading code of a remaining portion of the stored code sequence Ci is searched for.

Then, at a step S58, the controller sequentially reads and processes the remaining code sequence portion, as it consists of one or more sentence code sequences 32 and/or one or more character code sequences 33.

As a result, a corresponding image data sequence is sequentially prepared in a similar manner to the described manner and stored in unoccupied memory areas of the page memory or page memories of the message memory 8 that correspond to display segments (m,n) (m=1~4, n=1~8) in the remaining subregions of the display region 40.

Then, at a step S59, a resultant image data sequence is sequentially output to the display 11, where it is processed to display a corresponding page message over the display region 40.

Respective image data sequences may be sequentially processed for a display on the display region 40, substantially concurrently with their storage in the message memory 8.

FIGS. 3A to 3D shows examples of the displayed page message at the step S59, together with their message code sequences in terms of a string of code editorial characters.

The string of code editorial characters may preferably be displayed.

According to the embodiment, in a radio paging receiver P including: a first memory 5, 6 for storing therein a plurality of subsets of a set of character data of which an arbitrary one is representative of a corresponding one of a plurality of subsets of a set of characters and accessible by a corresponding one of a plurality of first codes; a second memory 4 for storing therein a plurality of illustration data of which an arbitrary one is representative of a corresponding one of a plurality of illustrations and accessible by a corresponding one of a plurality of second codes; a controller 10 sequentially responsive to a code sequence Ci representative of a page message, the code sequence Ci containing the corresponding first code and the corresponding second code, for reading a corresponding data sequence containing the arbitrary subset of the set of character data from the first memory and the arbitrary illustration data from the second memory and processing the read data sequence to provide a sequence of image data; and a display member 11 responsive to the sequence of image data for displaying the page message containing the arbitrary subset of the set of characters and the arbitrary illustration, the display member 11 has a display region 40 for displaying thereon the page message, the display region 40 being composed of a matrix of display segments (m,n) each respectively displayable of an arbitrary element of the set of characters, the display region 40 being divided into a matrix of subregions <i,j> each respectively consisting of a predetermined number of elements of the matrix of display segments and displayable of an arbitrary one of the plurality of illustrations, the code sequence Ci has a subsequence thereof containing a combination of the corresponding second code and a third code representing a certain element of the matrix of subregions of the display region, and the controller 10 is responsive to the subsequence of the code sequence to provide the sequence of image data with additional information representative of the third code so that the display region 40 displays the arbitrary illustration by the predetermined number of elements of the matrix of display segments at the certain element of the matrix of subregions, allowing the remaining elements of the matrix of display segments to elementwise continuously display the arbitrary subset of the set of characters.

Therefore, the pager P is permitted to display an arbitrary one of available illustrations over a predetermined number of display segments in an arbitrary one of matrix-arrayed subregions of a display region of the display member 11, allowing display segments of the remaining subregions to elementwise continuously display a subset of a total set of available characters.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio paging receiver including:

a first memory for storing therein a plurality of subsets of a set of character data of which an arbitrary one is representative of a corresponding one of a plurality of subsets of a set of characters and accessible by a corresponding one of a plurality of first codes;

a second memory for storing therein a plurality of illustration data of which an arbitrary one is representative of a corresponding one of a plurality of illustrations and accessible by a corresponding one of a plurality of second codes;

a controller sequentially responsive to a code sequence representative of a page message, the code sequence containing the corresponding first code and the corresponding second code, for reading a corresponding data sequence containing the arbitrary subset of the set of character data from the first memory and the arbitrary illustration data from the second memory and processing the read data sequence to provide a sequence of image data; and a display member responsive to the sequence of image data for displaying the page message containing the arbitrary subset of the set of characters and the arbitrary illustration, wherein the display member has a display region for displaying thereon the page message, the display region being composed of a matrix of display segments each respectively displayable of an arbitrary element of the set of characters, the display region being divided into a matrix of subregions each respectively consisting of a predetermined number of elements of the matrix of display segments and displayable of an arbitrary one of the plurality of illustrations, wherein the code sequence has a subsequence thereof containing a combination of the corresponding second code and a third code representing a certain element of the matrix of subregions of the display region, and wherein the controller is responsive to the subsequence of the code sequence to provide the sequence of image data with additional information representative of the third code so that the display region displays the arbitrary illustration by the predetermined number of elements of the matrix of display segments at the certain element of the matrix of subregions, allowing the remaining elements of the matrix of display segments to elementwise continuously display the arbitrary subset of the set of characters.

2. A radio paging receiver with a call message development function responsive to code information including a sentence, an illustration and a matrix character contained in a message signal following a received paging number for reading to display the sentence, the illustration and the matrix character, as they correspond thereto, wherein:

the radio paging receiver includes means responsive to a call to an operator by a call message using code information including a sentence, a matrix character and letters including a figure, and an illustration, as they are prepared by another radio paging receiver having an identical call message development function to the radio paging receiver at a receiving end, for developing message information containing the illustration into an original display data sequence to display the message information.

3. A radio paging receiver according to claim 2, wherein the radio paging receiver includes:

editing means for editing a message including the sentence, the matrix character and the letters including the figure, and the illustration; and developing means responsive to the call to the operator by the call message for developing the message information containing the illustration into the original display data sequence.

4. A radio paging receiver according to claim 2, wherein the radio paging receiver includes:

a decoder for receiving data from a radio section to detect a call to the radio paging receiver;

an ID-ROM for storing therein an ID number of the respective radio paging receiver;

an illustration memory for storing therein illustration information corresponding to code information of the illustration;

a regular sentence memory for storing therein sentence information of the sentence;

a matrix character memory for storing therein a character code of the matrix character;

a program memory for storing therein a program;

a message memory for storing therein received message information containing the illustration;

a display for displaying the call message; and a functional controller for executing the program, as it is read from the program memory, to perform a sequence control in the respective radio paging receiver including the editing of the message information and the development of the message information into the original display data sequence.

* * * * *